Nov. 28, 1933.  C. E. ARMSTRONG  1,937,458
MULTIPLE CONTROL THERMOSTAT AND SWITCH
Filed Nov. 18, 1931   2 Sheets-Sheet 2

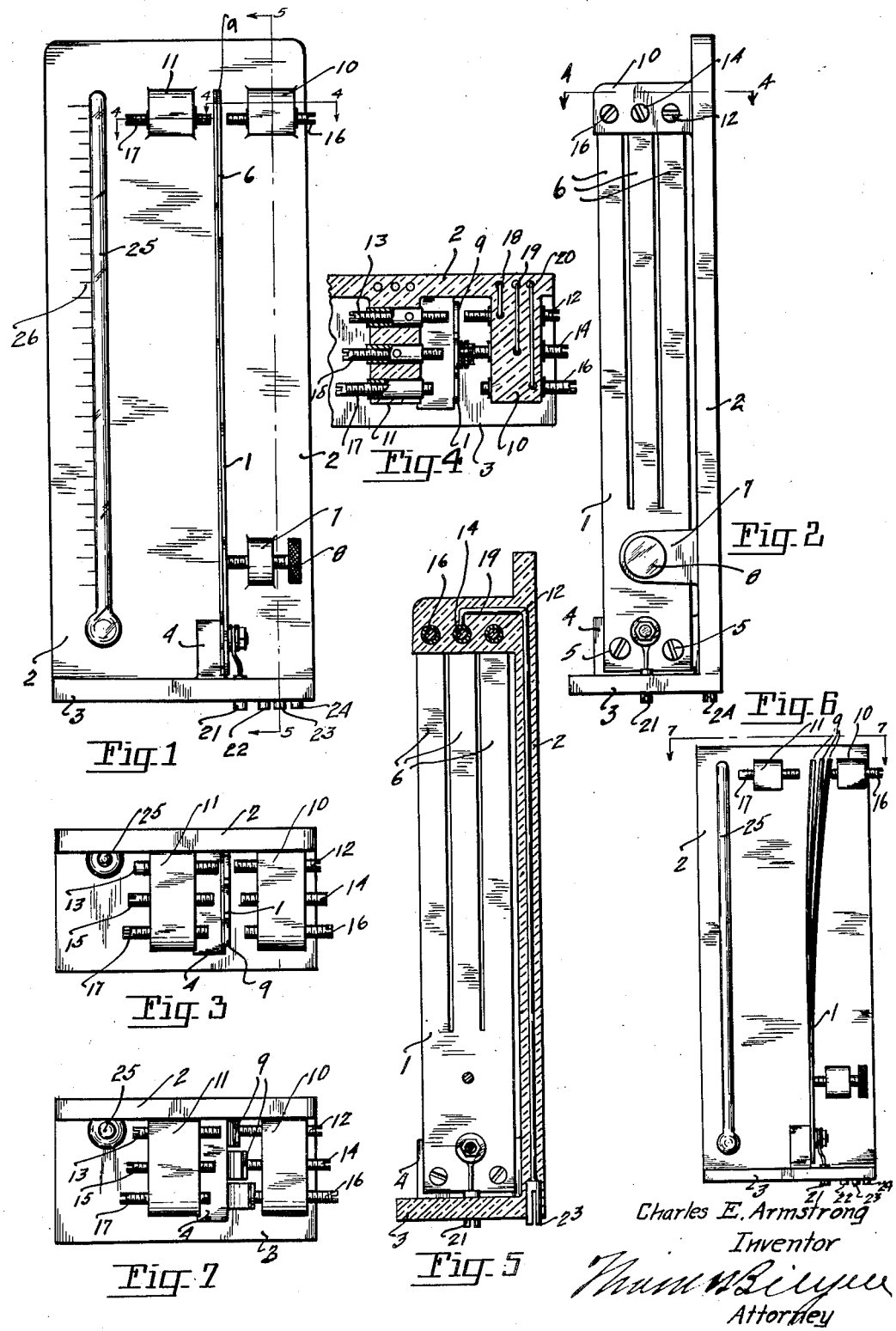

Charles E. Armstrong
Inventor
Attorney

Patented Nov. 28, 1933

1,937,458

UNITED STATES PATENT OFFICE 1,937,458

MULTIPLE CONTROL THERMOSTAT AND SWITCH

Charles E. Armstrong, Corvallis, Oreg.

Application November 18, 1931
Serial No. 575,808

2 Claims. (Cl. 200—139)

My invention is adapted for being used as a heat control or regulator, in any and all places where it is desired to control the heat, or temperature, within a room or building as in green houses, bakeries, buildings, or in any and all places where it is found desirable, or necessary to closely control the heat, or temperature within the space.

The invention is comprised primarily of a panel having a thermostat bar, divided into a plurality of fingers fixedly secured upon its one end to the base of the panel, and having electric terminals disposed at either side of the free end of the fingers of the thermostat bar, in order that an electric circuit may be completed upon a rise, or fall of temperature within the desired temperature limits to be controlled. The electric circuits lead from the electric terminals to a prime mover to be energized, that is to be used in the regulating of the heat, or for the raising and lowering of ventilators, or draft controls to thereby regulate the temperature within the range desired.

One of the objects of my invention is to provide different gradients of movement, as in a green house, where it may be found desirable to open the ventilators, at different amounts as the temperature rises, and to close the ventilators at different amounts, as the temperature falls.

I have here shown, in one embodiment of my device these gradients for the opening and closing of the ventilators. The same device may be used with equal facility for regulating, or controlling the draft controls in a slightly modified form of my device. I have used a wafer thermostat for imparting movement to the thermostat bar and to manipulate the same thereby against a settable spring tension. The different embodiments being used for different services, for the convenience of the operator and for the setting of the terminals within the prescribed ranges to be met at different seasons of the year, or for different times of the day. A thermometer is also placed upon the panel.

A further object of my invention consists in providing a simply constructed device that is comprised of a few parts for use in green houses, in the proof and dough room of bakeries, in dry kilns of manufacturing plants, in dehydrating plants, in pulp and paper mills and in any and all places where a rugged simply constructed device is made available for use for the regulating of temperature and draft controls.

A still further object of my invention consists in supplying a single unit comprised of the essential elements for the opening and closing of electric circuits, that are to run to and from a reversible electric motor to thereby predetermine the direction of rotation of the electric prime mover for regulating and manipulating ventilators and draft controls, and for predetermining the temperature range to be maintained within the space desired.

And a still further object of my invention consists in so constructing the device that it may be operated by unskilled workmen.

And a still further object of my invention consists in so constructing my device that it will have a minimum first cost, will have a long useful life and that may be used in a very large range of uses and that may have a universal application.

With these incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

In the drawings:

Fig. 1 is a front view of a preferred embodiment of my assembled device.

Fig. 2 is a side view of the mechanism illustrated in Fig. 1.

Fig. 3 is a top plan view of the mechanism illustrated in Fig. 1.

Fig. 4 is a fragmentary, sectional end view of the mechanism illustrated in Fig. 1. The same being taken on line 4—4 of Fig. 1, looking in the direction indicated.

Fig. 5 is a sectional side view of the mechanism illustrated in Fig. 1. The same being taken on line 5—5 of Fig. 1, looking in the direction indicated.

Fig. 6 is a side view of the mechanism illustrated in Fig. 1. In this view the thermostat connections are each shown as being contacting the electric terminals disposed within the line of travel of the thermostat bars.

Fig. 7 is a top, plan view of the mechanism illustrated in Fig. 6. The same being taken on line 7—7 of Fig. 6, looking in the direction indicated.

Like reference characters refer to like parts throughout the several views.

Figure 8:
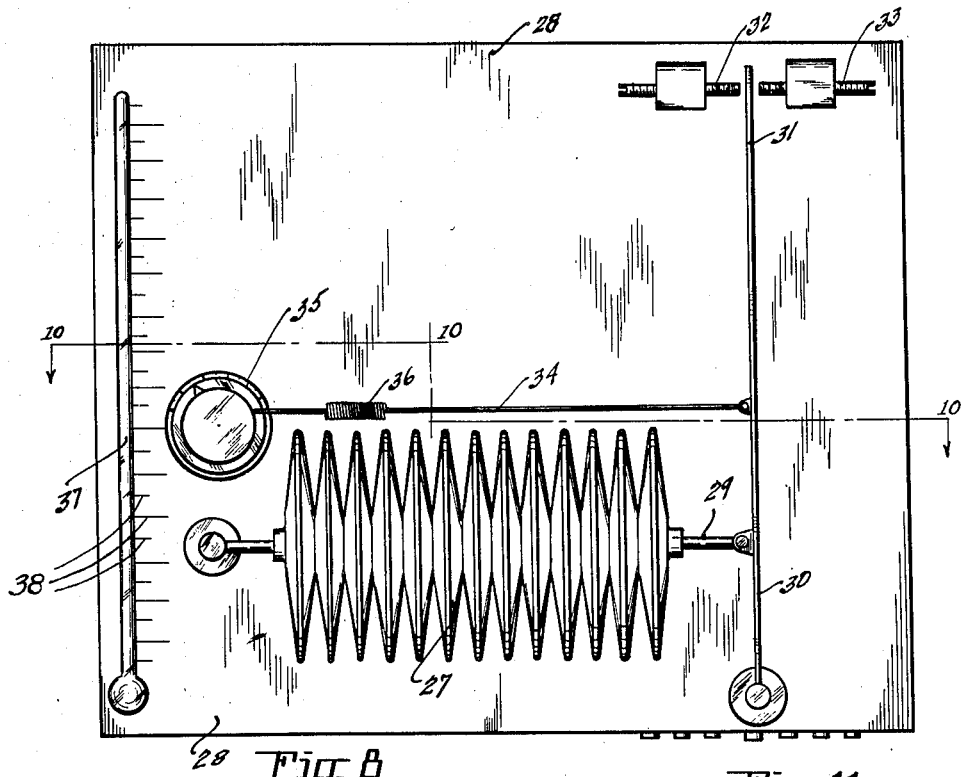
Fig. 8 is a front view of a still further modified form of my device.

I preferably mount a thermostat bar 1 within a suitable supporting frame 2. The supporting frame has a foot 3 outwardly extending from one side and at the bottom end of the frame 2. A lug 4 upwardly extends from the base, or foot 3. The thermostat bar is secured to the lug by any suitable fastening means as through the use of screws 5. The thermostat bar 1 is divided into a plurality of terminals 6 here shown as three in number, but I do not wish to be limited to any particular number of terminals as the device is susceptible of being subdivided into any desired number. The thermostat bar 1 preferably being made of a single piece and the divisions being made in the free end.

A lug 7 outwardly extends from the frame 2 and an adjusting screw 8 is threadably secured to the lug 7 and is adapted for positioning the free end 9, of the thermostat terminals relative to a plurality of electric terminals disposed at either side of the thermostat bar. In order that the temperature may be regulated above and below the normal central position of the thermostat, adjustments are provided. Lugs 10 and 11 outwardly extend from the frame 2 and electric terminals 12 and 13 are disposed at the oppositely disposed sides of each of the thermostat terminals. The terminals are adapted for contacting each other at predetermined temperature changes.

Electric terminals 14 and 15 are disposed within the line of movement of the central one of the thermostat terminals and are spaced farther apart than the terminals 12 and 13. In order that the electric circuits may be completed at different temperatures than the electric terminals 12 and 13 electric terminals 16 and 17 are still further spaced apart than the terminals 13 and 15 and for the same reason the electric terminals 12 to 16 inclusive are adapted for being adjusted toward and away from each other in order to predetermine the temperatures at which the contact is to be made and the circuit is to be completed.

Figures 9, 12:
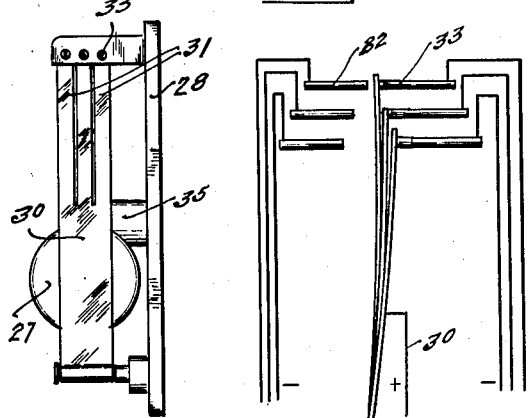
Fig. 9 is a side view of the mechanism illustrated in Fig. 8.
Fig. 12 is a diagrammatical layout of the electric circuits disposed within the panel as illustrated in Fig. 8.
Figure 10:
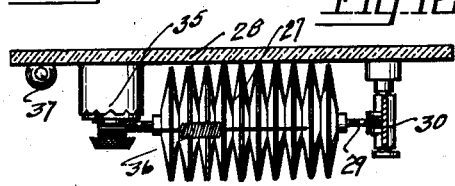
Fig. 10, is a sectional plan view, of the mechanism illustrated in Fig. 8. The same being taken on line 10—10 of Fig. 8, looking in the direction indicated.
Figure 11:
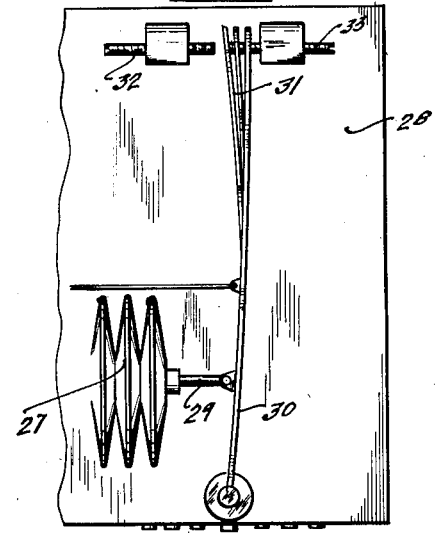
Fig. 11 is a fragmentary front view of a part of the mechanism illustrated in Fig. 8. The view being made to illustrate each of the terminals of the thermostat bar being in contact and in engagement with the electric terminals disposed in the line of travel of the thermostat terminals.

Electric circuits 18, 19 and 20 are adapted for being in its line of travel. An electric terminal 21 is associated at the base of the frame with the thermostat bar and electric terminals 22, 23 and 24 are associated with the electric conduits 18, 19 and 20. In order to facilitate the attachment of the electric circuits leading to the source of supply of electric energy not here shown, the frame of the device is made of any suitable insulated material to facilitate the operation of the device. A thermometer 25 may be mounted upon the thermostat and graduations 26 being disposed upon the frame in order to make an ocular demonstration of the actual temperature. The device may be made as illustrated in Figs. 8 to 12 inclusive in which a wafer thermostat 27 is mounted upon a panel 28. The shaft 29 of the wafer thermostat being hingedly secured to a thermostatically operated bar 30, which is divided into a plurality of contacting terminals 31 disposed in registry with electric terminals and each of which are adapted for contacting therewith at different temperatures. A bar 34 is secured upon its one end to the bar 30 and upon its oppositely disposed end to a settable dial 35 so that the dial may be set at the temperature arranged at which the thermostat is to contact the electric terminals. A reacting element 36 is disposed within the bar 34, to afford flexibility to the assembly. Panel 28 being made of insulating material and having electric conduits associated with each of the terminals and each of the electric conduits terminating in suitable electric connections to facilitate installation in connection of my device within electric circuits with which my device is to be used. A thermometer 37 is mounted upon the panel 28, and graduations 38 are disposed upon the panel and adjacent the thermometer.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claims which follow.

What I claim is:

1. In a device of the class described, the combination of a supporting frame, a foot outwardly extending from the base of the frame and a lug upwardly extending from the foot, a thermostatically operated bar comprised of a single piece, removably secured to the lug and formed with a plurality of integral and yieldable fingers, lugs outwardly extending from the supporting frame and spaced apart and at either side of the free end of the said yieldable fingers, electric terminals adjustably secured to the outwardly extending lugs, and an insulating support associated with each of the electric terminals.

2. In a device of the class described, the combination of a frame, a thermostatically operated bar comprised of a single piece removably secured to the frame and formed with a plurality of integral and yieldable fingers, settable means for adjusting said bar, adjustable electric terminals disposed in the line of movement of the free end of said fingers.

CHARLES E. ARMSTRONG.